United States Patent
Coffey

(10) Patent No.: US 12,442,115 B2
(45) Date of Patent: Oct. 14, 2025

(54) HIGH SURFACE AREA BRAIDS

(71) Applicant: KURARAY CO., LTD., Kurashiki (JP)

(72) Inventor: Patrick Coffey, Houston, TX (US)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 18/533,366

(22) Filed: Dec. 8, 2023

(65) Prior Publication Data
US 2024/0200244 A1    Jun. 20, 2024

Related U.S. Application Data

(60) Provisional application No. 63/432,160, filed on Dec. 13, 2022.

(51) Int. Cl.
| | | |
|---|---|---|
| D04C 1/02 | (2006.01) | |
| A61B 17/06 | (2006.01) | |
| D04C 1/12 | (2006.01) | |
| A61B 17/00 | (2006.01) | |
| A61L 17/10 | (2006.01) | |

(52) U.S. Cl.
CPC .......... D04C 1/02 (2013.01); A61B 17/06166 (2013.01); D04C 1/12 (2013.01); A61B 2017/00526 (2013.01); A61B 2017/06176 (2013.01); A61L 17/10 (2013.01); D10B 2401/063 (2013.01); D10B 2401/20 (2013.01); D10B 2509/04 (2013.01)

(58) Field of Classification Search
CPC .... D04C 1/02; D04C 1/06; D04C 1/12; A61B 17/06166; A61B 2017/00526; A61B 2017/06176
See application file for complete search history.

(56) References Cited

U.S. PATENT DOCUMENTS

| | | | | |
|---|---|---|---|---|
| 387,075 A | * | 7/1888 | Hood | D04C 1/06 87/41 |
| 2,196,900 A | * | 4/1940 | Girard | B65H 51/14 87/30 |

(Continued)

FOREIGN PATENT DOCUMENTS

EP    2229109 B1    9/2018

OTHER PUBLICATIONS

International Search Report and Written Opinion issued Feb. 26, 2024 in PCT/US2023/083045, 13 pages.

(Continued)

*Primary Examiner* — Shaun R Hurley
(74) *Attorney, Agent, or Firm* — Element IP, PLC

(57) ABSTRACT

Disclosed herein are filamentary braids containing a plurality of filamentary elements braided together, where the filamentary elements include one or more main filamentary elements and one or more looped filamentary elements. The looped filamentary elements are arranged in one or more looped structures extending outward from the longitudinal axis formed by the main filamentary elements. The looped filamentary elements are made of a fiber having a tensile modulus of 2.3 GPa or more. Upon application of selective tension to the looped filamentary elements, the looped filamentary elements (i) are collapsible against the main filamentary elements in the filamentary braid and/or (ii) are removable from the filamentary braid.

15 Claims, 5 Drawing Sheets

(56) References Cited

U.S. PATENT DOCUMENTS

| | | | | |
|---|---|---|---|---|
| 2,354,212 | A * | 7/1944 | Jeckel | D04C 3/44 87/41 |
| 2,407,929 | A * | 9/1946 | Jeckel | D04C 1/00 604/527 |
| 3,365,872 | A * | 1/1968 | Field, Jr. | D02G 3/367 57/328 |
| 3,367,095 | A * | 2/1968 | Field, Jr. | D02G 3/367 57/328 |
| 3,975,980 | A * | 8/1976 | Hood | D07B 7/16 87/6 |
| 4,311,079 | A * | 1/1982 | Hood | D04C 1/12 87/6 |
| 4,662,886 | A * | 5/1987 | Moorse | A61F 2/08 606/230 |
| 5,067,384 | A * | 11/1991 | Scala | D04C 1/06 87/6 |
| 5,732,541 | A * | 3/1998 | Kunzelman | D07B 5/00 87/5 |
| 7,134,267 | B1 * | 11/2006 | Gilmore | D02G 3/047 57/237 |
| 8,695,317 | B2 * | 4/2014 | Erlendsson | D07B 5/005 57/310 |
| 9,464,382 | B2 * | 10/2016 | Safwat | D07B 1/16 |
| 10,301,773 | B2 * | 5/2019 | Safwat | D07B 1/16 |
| 2009/0216269 | A1 | 8/2009 | Harrington et al. | |
| 2009/0270800 | A1 * | 10/2009 | Spurchise | A61M 25/0074 604/95.04 |
| 2010/0298872 | A1 * | 11/2010 | Berndt | A61B 17/06166 87/8 |
| 2012/0118131 | A1 * | 5/2012 | Erlendsson | D04C 1/12 87/8 |
| 2013/0247536 | A1 * | 9/2013 | Erlendsson | A01K 75/00 57/309 |
| 2014/0013931 | A1 | 1/2014 | Dow et al. | |
| 2015/0173753 | A1 * | 6/2015 | Spivey | A61B 17/06166 606/228 |
| 2017/0058454 | A1 * | 3/2017 | Safwat | A01K 75/00 |
| 2020/0391008 | A1 * | 12/2020 | Kim | A61L 29/02 |

OTHER PUBLICATIONS

International Preliminary Report on Patentability and Written Opinion issued Jun. 26, 2025, in PCT/US2023/083045, 10 pages.

* cited by examiner

HIGH SURFACE AREA BRAIDS

TECHNICAL FIELD

This application relates to materials technology in general and more specifically to braids comprising filamentary elements. More particularly, this application discloses filamentary braids comprising a plurality of filamentary elements braided together, where the filamentary elements include one or more main filamentary elements and one or more looped filamentary elements. The looped filamentary elements confer a higher surface area to the filamentary braid compared to a filamentary braid formed without looped filamentary elements. Filamentary braids disclosed herein are useful, for example, in applications where slippage of filamentary braids is undesirable, such as surgical sutures.

BACKGROUND OF THE INVENTION

Barbed sutures are known, and can reduce slippage compared to non-barbed sutures. For example, U.S. Pat. No. 9,044,224 describes barbed sutures formed by inserting monofilament fragments into a multifilament elongate body. A portion of the monofilament fragment extends beyond the outer surface of the multifilament elongate body, forming a barb on the suture. Similarly, U.S. Pat. No. 10,786,243 describes barbed sutures formed from a flocking process, by adhering individual barb members to a woven thread. The adhering can be performed by fusion welding, application of adhesives, ultrasonic welding, or lamination.

However, such barbed sutures are complicated to produce, in part because the barbs are not formed from filaments that are integrated into the braid of the suture. Instead, the barbs are inserted into or adhered onto the braided filaments forming the suture. Alternatively, barbs may be created by cutting into the monofilament and lifting the cut segment from the central axis of the filament. This complicates the process of producing such barbed sutures.

On the other hand, US 2010/0298872 describes braided sutures comprising protruding loops, where the protruding loops can be formed from filaments of the filamentary braid. These braided sutures can be produced by continuous braiding, where the loops are formed by overfeeding the respective filament. Thus, these loops can be formed from filaments that are integrated into the braid of the suture. This simplifies production of the suture compared to methods requiring insertion or adhesion of separate barbs.

Whether the barbs/loops are formed from integrated filaments or external filaments, however, all of the above sutures can be difficult to place in a patient. For example, if the suture is made of a non-dissolving material, then removal methods must be considered prior to placement of the suture. This is because the barbed suture might only be able to be removed in the direction opposite to the direction the barbs point.

There remains a need for improvements in filamentary braids having sufficient gripping strength for use as sutures, without suffering the above-mentioned drawbacks of complicated production and difficulty of removal.

SUMMARY OF THE DISCLOSURE

The present inventors have recognized that a need exists to develop filamentary braids having increased surface area for improved gripping, which are relatively simple to produce and relatively convenient to remove when no longer needed in a particular application.

The following disclosure describes the preparation and utility of filamentary braids comprising looped filamentary elements, where the looped filamentary elements are collapsible and/or removable from the filamentary braid.

Embodiments of the present disclosure, described herein such that one of ordinary skill in this art can make and use them, include the following:

(1) One aspect relates to a filamentary braid comprising a plurality of filamentary elements braided together,
  wherein the filamentary elements comprise one or more main filamentary elements and one or more looped filamentary elements,
  wherein the looped filamentary elements are arranged in one or more looped structures extending outward from the longitudinal axis formed by the main filamentary elements,
  wherein the looped filamentary elements are made of a fiber having a tensile modulus of 2.3 GPa or greater, and
  wherein, upon application of selective tension to the looped filamentary elements, the looped filamentary elements (i) are collapsible against the main filamentary elements in the filamentary braid and/or (ii) are removable from the filamentary braid.

(2) Another aspect relates to methods of producing such a filamentary braid, by braiding using a plurality of bobbins, at least one of which operates at a lower tension and/or faster feed rate than other of the bobbins to form the looped filamentary elements.

Additional objects, advantages and other features of the present disclosure will be set forth in part in the description that follows and in part will become apparent to those having ordinary skill in the art upon examination of the following or may be learned from the practice of the present disclosure. The present disclosure encompasses other and different embodiments from those specifically described below, and the details herein are capable of modifications in various respects without departing from the present disclosure. In this regard, the description herein is to be understood as illustrative in nature, and not as restrictive.

BRIEF DESCRIPTION OF THE DRAWINGS

Embodiments of this disclosure are explained in the following description in view of the figures.

DETAILED DESCRIPTION

Figure 1:
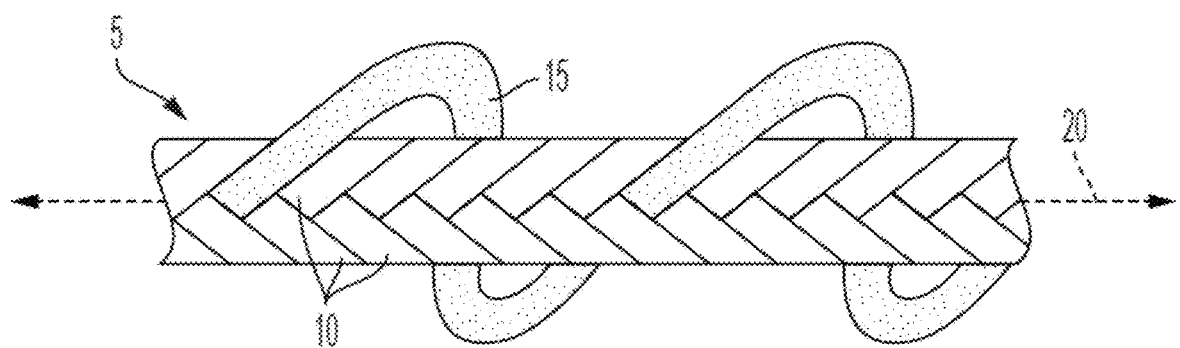
FIG. 1 is a schematic illustration of an exemplary embodiment of a filamentary braid, showing a looped filamentary element arranged in a looped structure extending outward from the longitudinal axis formed by the main filamentary elements.

Embodiments of this disclosure include various filamentary braids, as well as methods of producing the filamentary braids.

Unless otherwise defined, all technical and scientific terms used herein have the same meaning as commonly understood by persons of ordinary skill in the relevant art. In case of conflict, the present specification, including definitions, will control.

Unless stated otherwise, all percentages, parts, ratios, etc., are by weight.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure is to be limited to the specific values recited when defining a range.

The use of "a" or "an" to describe the various elements and components herein is merely for convenience and to give a general sense of the disclosure. This description should be read to include one or at least one and the singular also includes the plural unless it is clear that it is otherwise intended.

Unless expressly stated to the contrary, "or" and "and/or" refers to an inclusive and not to an exclusive. For example, a condition "A or B", or "A and/or B", is satisfied by any one of the following: A is true (or present) and B is false (or not present), A is false (or not present) and B is true (or present), and both A and B are true (or present).

The terms "about" and "approximately" as used herein refer to being nearly the same as a referenced amount or value, and should be understood to encompass ±5% of the specified amount or value.

The term "substantially" as used herein, unless otherwise defined, means all or almost all or the vast majority, as would be understood by the person of ordinary skill in the context used. It is intended to take into account some reasonable variance from 100% that would ordinarily occur in industrial-scale or commercial-scale situations.

Throughout the present description, unless otherwise defined and described, technical terms and methods employed to determine associated measurement values are in accordance with the description of ASTM D855/D885M-10A (2014), Standard Test Methods for Tire Cords, Tire Cord Fabrics, and Industrial Filament Yarns Made From Man-made Organic-base Fibers, published October 2014.

For convenience, many elements of the various embodiments disclosed herein are discussed separately. Although lists of options may be provided and numerical values may be in ranges, the present disclosure should not be considered as being limited to the separately described lists and ranges. Unless stated otherwise, each and every combination possible within the present disclosure should be considered as explicitly disclosed for all purposes.

The materials, methods, and examples herein are illustrative only and, except as specifically stated, are not intended to be limiting. Methods and materials similar or equivalent to those described herein may also be used in the practice or testing of the present disclosure.

Filamentary Braid

Embodiments described herein include filamentary braids comprising a plurality of filamentary elements braided together. The filamentary elements comprise one or more main filamentary elements and one or more looped filamentary elements. The looped filamentary elements are arranged in one or more looped structures extending outward from the longitudinal axis formed by the main filamentary elements. The looped filamentary elements are made of a fiber having a tensile modulus of 2.3 GPa or greater. Upon application of selective tension to the looped filamentary elements, the looped filamentary elements (i) are collapsible against the main filamentary elements in the filamentary braid and/or (ii) are removable from the filamentary braid.

As used herein, a "filamentary element" may be a monofilament fiber or a multifilament fiber. If a multifilament fiber, the filamentary element comprises a plurality of filaments combined together into a multifilament, for example by, but not limited to, twisting or braiding individual filaments to form the multifilament.

As used herein, a "main filamentary element" is a filamentary element that forms the braided structure of the filamentary braid by contact with other filamentary elements over substantially the entire length of the filamentary braid. A plurality of main filamentary elements braided together forms a longitudinal axis generally along the direction in which the braid is formed.

In contrast, a "looped filamentary element" is a filamentary element that is arranged in one or more looped structures. The looped structures extend outward from the longitudinal axis formed by the main filamentary elements. Due to this outward extension, the looped filamentary elements are in contact with the main filamentary elements over less than substantially the entire length of the filamentary braid.

FIG. 1 is a schematic illustration of an exemplary embodiment of a filamentary braid. In FIG. 1, filamentary braid 5 comprises a plurality of filamentary elements. The filamentary elements comprise main filamentary elements 10 and looped filamentary elements 15. The looped filamentary elements 15 extend outward from the longitudinal axis 20 formed by the main filamentary elements 10. As seen in FIG. 1, the looped filamentary elements 15 include a portion that is in contact with one or more main filamentary elements 10, and a portion that is not in contact with one or more main filamentary elements 10. The portions of the looped filamentary elements 15 that are not in contact with main filamentary elements 10 generally correspond to the looped structures extending outward from the longitudinal axis 20 formed by the main filamentary elements 10. Because of this, the looped filamentary elements 15 are in contact with the main filamentary elements 10 over less than substantially the entire length of the filamentary braid 5.

Figure 2:
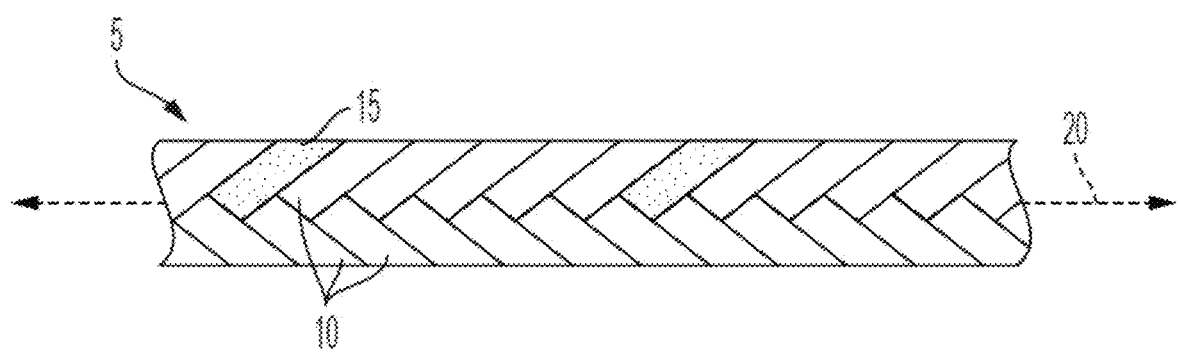
FIG. 2 is a schematic illustration of a filamentary braid, wherein the looped filamentary element collapses against the main filamentary elements upon application of selective tension to the looped filamentary element.

FIG. 2 is a schematic illustration of a filamentary braid 5, wherein the looped filamentary elements 15 collapse against the main filamentary elements 10 upon application of selective tension to the looped filamentary elements 15. "Selective tension" means tension that is applied to one or more of the looped filamentary elements 15 differently from tension applied to one or more of the main filamentary elements 10. For example, such selective tension could be (i) tension applied to one or more of the looped filamentary elements 15 without simultaneously applying tension to one or more of the main filamentary elements 10, or (ii) tension applied to one or more of the looped filamentary elements 15 that is greater in degree than tension simultaneously applied to one or more of the main filamentary elements 10. The collapsing of the looped filamentary elements 15 against the main filamentary elements 10 can be a complete collapse, whereby the looped filamentary elements 15 become in contact with the main filamentary elements 10 over substantially the entire length of the filamentary braid 5. Alternatively, the collapsing of the looped filamentary elements 15 against the main filamentary elements 10 can be less than a complete collapse, whereby the looped filamentary elements 15 remain in contact with the main filamentary elements 10 over less than substantially the entire length of the filamentary braid 5, but in greater contact than they were before the collapsing, as discussed in more detail below for FIG. 4.

Figure 3:
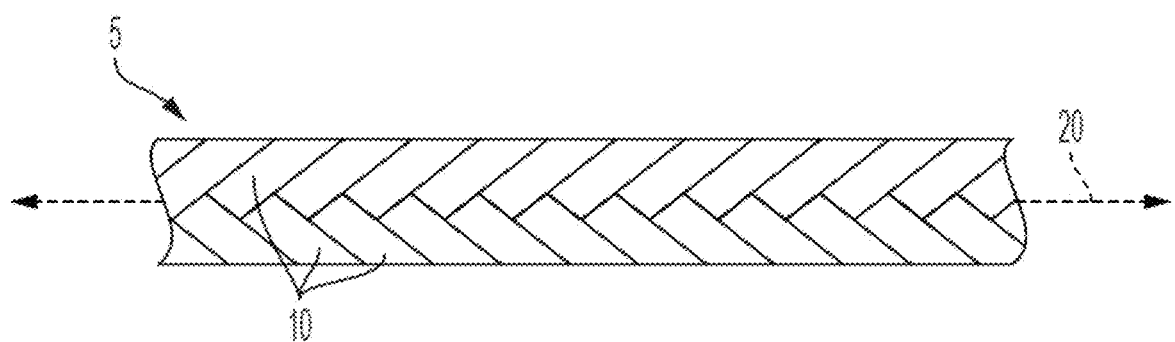
FIG. 3 is a schematic illustration of a filamentary braid, wherein the looped filamentary element has been removed from the filamentary braid upon application of selective tension to the looped filamentary element.

FIG. 3 is a schematic illustration of a filamentary braid 5, wherein the looped filamentary elements 15 have been removed from the filamentary braid 5 upon application of selective tension to the looped filamentary elements 15. As in FIG. 2, "selective tension" means tension that is applied to one or more of the looped filamentary elements 15 differently from tension applied to one or more of the main filamentary elements 10, such as (i) tension applied to one or more of the looped filamentary elements 15 without simultaneously applying tension to one or more of the main filamentary elements 10, or (ii) tension applied to one or more of the looped filamentary elements 15 that is greater in degree than tension simultaneously applied to one or more of the main filamentary elements 10.

Figure 4:
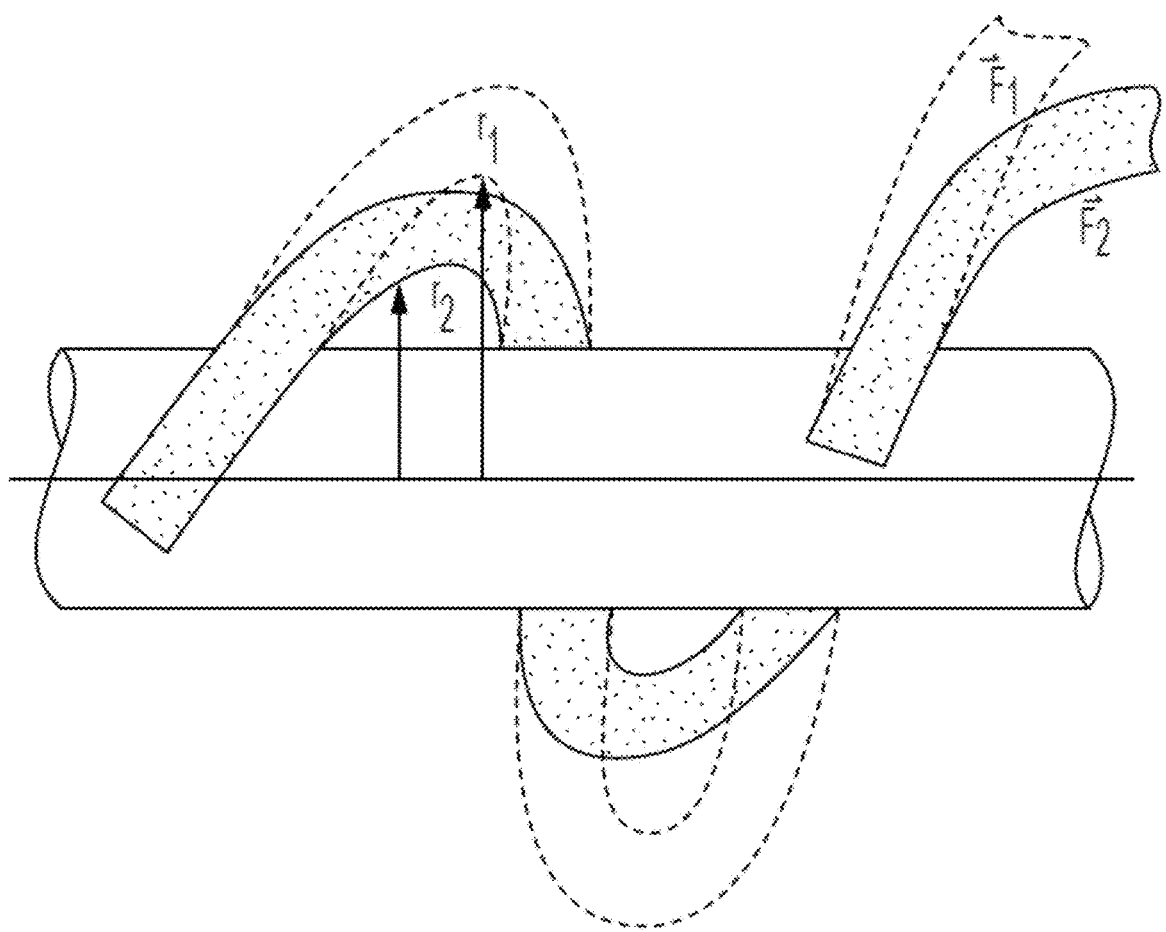
FIG. 4 is a schematic illustration of a filamentary braid, wherein the looped filamentary element has partially, but not completely, collapsed.

FIG. 4 is a schematic illustration of a filamentary braid, wherein the looped filamentary element has partially, but not completely, collapsed. In this embodiment, $r_1$ is the radius when there is no tension applied to the looped filamentary element (or when the applied tension is below that required to overcome static friction between the looped filamentary element and the main filamentary elements) and $r_2$ is the radius after static friction has been overcome. Similarly, $F_1$ is the tensile force when there is no tension applied to the looped filamentary element (and/or when the applied tension is below that required to overcome static friction) and $F_2$ is the tensile force after static friction has been overcome.

Upon application of selective tension to the looped filamentary elements, the looped filamentary elements (i) are collapsible against the main filamentary elements in the filamentary braid and/or (ii) are removable from the filamentary braid. The magnitude of selective tension required to collapse the looped filamentary elements against the main filamentary elements, or to remove the looped filamentary elements from the filamentary braid, may differ depending on factors such as the composition of the filamentary elements, the size (diameter and length) of the filamentary elements, and the number of filamentary elements in the filamentary braid. The applied tension must be low enough not to otherwise damage the filamentary braid. Such damage could occur, for example, by an applied tension that exceeds the yield load of the looped filamentary elements, thereby causing stretching of the looped filamentary elements (i) before collapse of the looped filamentary elements against the main filamentary elements and/or (ii) before removal of the looped filamentary elements from the filamentary braid. In the schematic illustration of FIG. 4, this means that the tensile force $F_2$ must be less than the yield load of the looped filamentary elements. In some embodiments, the magnitude of selective tension required to collapse the looped filamentary elements against the main filamentary elements, or to remove the looped filamentary elements from the filamentary braid, may be at least 50 grams (force), at least 100 grams, at least 200 grams, at least 300 grams, at least 400 grams, at least 500 grams, at least 600 grams, at least 700 grams, at least 800 grams, at least 900 grams, or at least 1000 grams. In some embodiments, the magnitude of selective tension required to collapse the looped filamentary elements against the main filamentary elements, or to remove the looped filamentary elements from the filamentary braid (without otherwise damaging the braid) may be at most 2500 grams, at most 2000 grams, at most 1500 grams, at most 1000 grams, at most 900 grams, at most 800 grams, at most 700 grams, at most 600 grams, at most 500 grams, at most 400 grams, at most 300 grams, at most 200 grams, or at most 100 grams.

To aid in the application of selective tension to the looped filamentary elements, the looped filamentary elements may be a different color than the main filamentary elements. In such embodiments, the degree of color difference is such that a person having ordinary eyesight can discern the looped filamentary elements from the main filamentary elements, either with the naked eye (i.e., unaided) or with an optical aid such as a magnifying glass or microscope. The color difference may be a difference in hue, but need not be. The color difference may be a difference in grayscale, such as black versus white, gray versus white, gray versus black, or a darker gray versus a lighter gray. In another embodiment, the looped filamentary elements may have a difference in radiopacity relative to the main filamentary elements. Such a difference in radiopacity allows for distinguishing the looped filamentary elements from the main filamentary elements by using radio wave and/or x-ray imaging techniques.

The looped filamentary elements in the present application are made of a fiber having a tensile modulus of 2.3 GPa or greater. The tensile modulus preferably is at least 3.0 GPa, at least 4.0 GPa, at least 5.0 GPa, at least 6.0 GPa, at least 7.0 GPa, at least 8.0 GPa, at least 9.0 GPa, at least 10 GPa, at least 15 GPa, at least 20 GPa, at least 25 GPa, at least 30 GPa, at least 35 GPa, at least 40 GPa, at least 45 GPa, at least 50 GPa, at least 55 GPa, at least 60 GPa, at least 65 GPa, at least 70 GPa, or at least 75 GPa. The tensile modulus preferably is at most 200 GPa, at most 150 GPa, at most 125 GPa, at most 100 GPa, at most 95 GPa, at most 90 GPa, at most 85 GPa, or at most 80 GPa. When the tensile modulus is within the above ranges, the looped filamentary elements are collapsible against the main filamentary elements in the filamentary braid, and/or are removable from the filamentary braid, by application of selective tension that generally does not exceed the yield strength of the fiber. Conversely, if the tensile modulus (and corresponding yield strength) of the fiber making up the looped filamentary elements is too low, then the selective tension applied to collapse or remove the looped filamentary elements might break or otherwise damage the looped filamentary elements prior to their collapse or removal.

The tensile modulus of the main filamentary elements in the present application is not particularly limited. The tensile modulus of the main filamentary elements may be different from the tensile modulus of the looped filamentary elements. In some embodiments, the tensile modulus of the main filamentary elements may be greater than the tensile modulus of the looped filamentary elements. In other embodiments, the tensile modulus of the main filamentary elements may be less than the tensile modulus of the looped filamentary elements. The main filamentary elements may be made of a fiber having a tensile modulus of less than 2.3 GPa, or 2.3 GPa or greater. The tensile modulus of the fiber of the main filamentary elements may be at least 3.0 GPa, at least 4.0 GPa, at least 5.0 GPa, at least 6.0 GPa, at least 7.0 GPa, at least 8.0 GPa, at least 9.0 GPa, at least 10 GPa, at least 15 GPa, at least 20 GPa, at least 25 GPa, at least 30 GPa, at least 35 GPa, at least 40 GPa, at least 45 GPa, at least 50 GPa, at least 55 GPa, at least 60 GPa, at least 65 GPa, at least 70 GPa, or at least 75 GPa. The tensile modulus preferably is at most 200 GPa, at most 150 GPa, at most 125 GPa, at most 100 GPa, at most 95 GPa, at most 90 GPa, at most 85 GPa, or at most 80 GPa.

The fiber having a tensile modulus of 2.3 GPa or greater preferably comprises a liquid crystal polymer (LCP) filament. LCP filaments include lyotropic polymer filaments and thermotropic polymer filaments. Lyotropic polymers decompose before melting but form liquid crystals in solution under appropriate conditions (these polymers typically are solution spun). Lyotropic polymer filaments include, for example, aramid and poly(p-phenylene benzobisoxazole) (PBO) filaments, as well as copolymer aramid filaments. Aramid filaments are commercially available under the tradename KEVLAR® from DuPont, and TWARON® from Teijin Ltd. A copolymer aramid filament is commercially available under the tradename TECHNORA® from Teijin Ltd. PBO fibers are commercially available under the tradename ZYLON® from Toyobo Company Ltd. Thermotropic polymers exhibit liquid crystal formation in melt form. Thermotropic filaments include, for example, an aromatic polyester formed by the polycondensation of 4-hydroxybenzoic acid and 6-hydroxynaphthalene-2-carboxylic acid, commercially available under the tradename VECTRAN® from KURARAY CO., LTD.

The looped filamentary elements preferably comprise one or more LCP filaments. The main filamentary elements also may comprise one or more LCP filaments. There is preferably a difference in surface friction between the looped filamentary elements and the main filamentary elements. That is, the looped filamentary elements may have a lower surface friction than the main filamentary elements, or, conversely, the main filamentary elements may have a lower surface friction than the looped filamentary elements. Such a difference in surface friction between the looped filamentary elements and the main filamentary elements aids in the collapse and/or removal of the looped filamentary elements. Such a difference in surface friction can be achieved by using filamentary elements having a low-friction coating as the low-friction filamentary elements.

In some embodiments, the looped filamentary elements can include non-LCP filaments, as long as the tensile modulus of the fiber making up the looped filamentary elements is 2.3 GPa or greater. Such non-LCP filaments include, but are not limited to, polyether ether ketone filaments (100 to 200 MPa), ultra-high molecular weight polyethylene filaments, high modulus polyethylene (HMPE) filaments, polypropylene (1.5 GPa) filaments, polyethylene terephthalate filaments (27 MPa), polyamide filaments, high-strength polyvinyl alcohol (1.7 GPa) filaments, polyhydroquinone diimidazopyridine (PIPD) filaments, and combinations thereof, just to name a few. In some embodiments, a single kind of non-LCP filament can be used. In other embodiments, two or more kinds of non-LCP filaments can be used. In yet other embodiments, a specific kind of non-LCP filament is excluded from the looped filamentary elements. For example, the looped filamentary elements may comprise no HMPE filaments.

In some embodiments, the main filamentary elements can include non-LCP filaments. Such non-LCP filaments include, but are not limited to, polyether ether ketone filaments, ultra-high molecular weight polyethylene filaments, high modulus polyethylene (HMPE) filaments, polypropylene filaments, polyethylene terephthalate filaments, polyamide filaments, high-strength polyvinyl alcohol filaments, polyhydroquinone diimidazopyridine (PIPD) filaments, and combinations thereof, just to name a few. In some embodiments, a single kind of non-LCP filament can be used. In other embodiments, two or more kinds of non-LCP filaments can be used. In yet other embodiments, a specific kind of non-LCP filament is excluded from the main filamentary elements. For example, the main filamentary elements may comprise no HMPE filaments.

Polymerized units of the LCP and non-LCP filaments may include those shown in Table 1.

TABLE 1

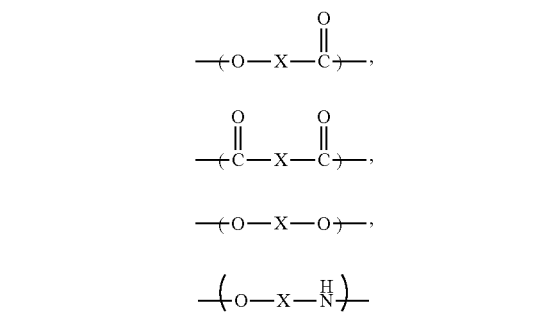

(in which X in the formulas is selected from the following structures)

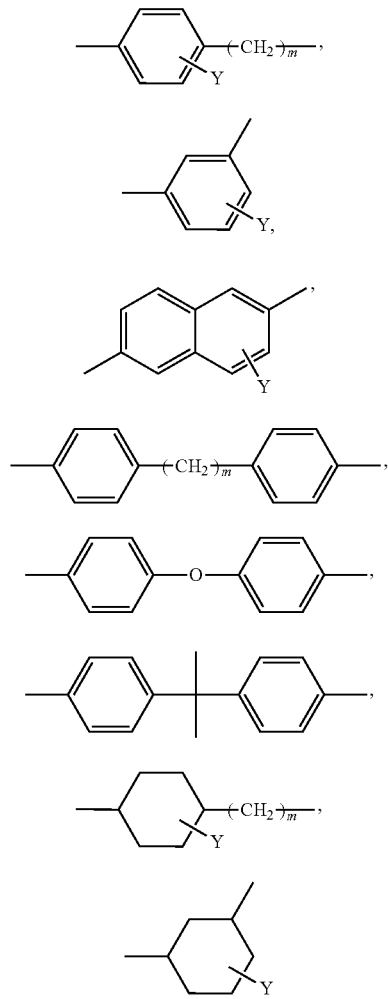

(in which m = 0 to 2, and Y = a substituent selected
from a hydrogen atom, a
halogen atom, an alkyl group, an aryl group,
an aralkyl group, an alkoxy group, an
aryloxy group, and an aralkyloxy group)

Regarding the polymerized units illustrated in Table 1 above, the number of Y substituent groups is equal to the maximum number of substitutable positions in the ring structure, and each Y independently represents a hydrogen atom, a halogen atom (for example, a fluorine atom, a chlorine atom, a bromine atom, an iodine atom, etc.), an alkyl group (for example, an alkyl group having 1 to 4 carbon atoms such as a methyl group, an ethyl group, an isopropyl group, or a t-butyl group), an alkoxy group (for example, a methoxy group, an ethoxy group, an isopropoxy group, an n-butoxy group, etc.), an aryl group (for example, a phenyl group, a naphthyl group, etc.), an aralkyl group [a benzyl group (a phenylmethyl group), a phenethyl group (a phenylethyl group), etc.], an aryloxy group (for example, a phenoxy group, etc.), an aralkyloxy group (for example, a benzyloxy group, etc.), or mixtures thereof.

LCP filaments may be obtained by melt spinning of a liquid crystalline polyester resin. The spun filaments may be further heat treated to enhance mechanical properties. The liquid crystalline polyester may be composed of a repeating polymerized unit, for example, derived from an aromatic diol, an aromatic dicarboxylic acid, or an aromatic hydroxycarboxylic acid. The liquid crystalline polyester may optionally further comprise a polymerized unit derived from an aromatic diamine, an aromatic hydroxyamine, and/or an aromatic aminocarboxylic acid.

More specific polymerized units are illustrated in the following structures shown in Tables 2 to 4 below.

When the polymerized unit in the formulas is a unit which can represent plural structures, two or more units may be used in combination as polymerized units constituting a polymer.

In the polymerized units of Tables 2, 3, and 4, n is an integer of 1 or 2, and the respective units n=1, n=2 may exist alone or in combination; and $Y_1$ and $Y_2$ each independently may be a hydrogen atom, a halogen atom (for example, a fluorine atom, a chlorine atom, a bromine atom, an iodine atom, etc.), an alkyl group (for example, an alkyl group having 1 to 4 carbon atoms such as a methyl group, an ethyl group, an isopropyl group, or a t-butyl group), an alkoxy group (for example, a methoxy group, an ethoxy group, an isopropoxy group, an n-butoxy group, etc.), an aryl group (for example, a phenyl group, a naphthyl group, etc.), an aralkyl group (a benzyl group (a phenylmethyl group), a phenethyl group (a phenylethyl group), etc.), an aryloxy group (for example, a phenoxy group, etc.), an aralkyloxy group (for example, a benzyloxy group, etc.), or mixtures thereof. Among these groups, Y is preferably a hydrogen atom, a chlorine atom, a bromine atom, or a methyl group.

TABLE 2

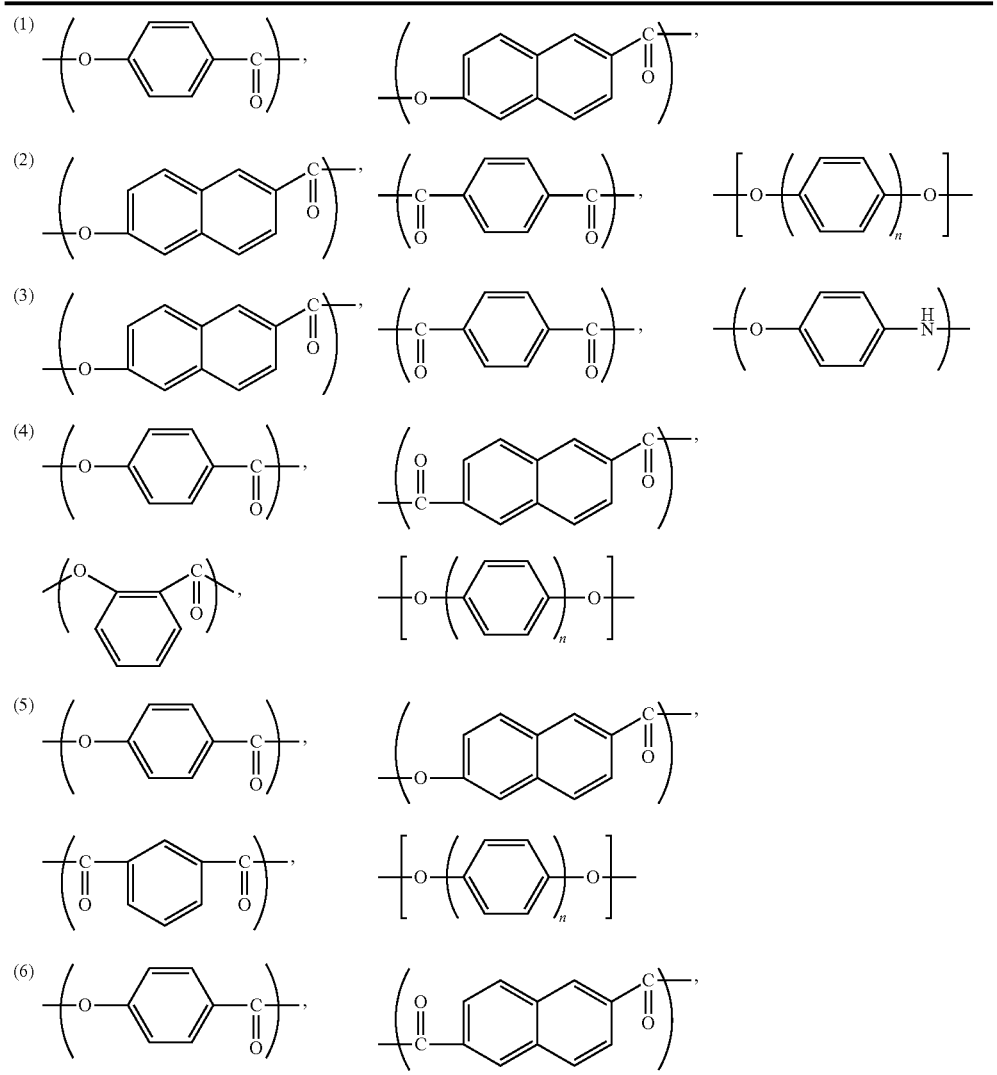

TABLE 2-continued
TABLE 3
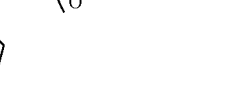

TABLE 3-continued
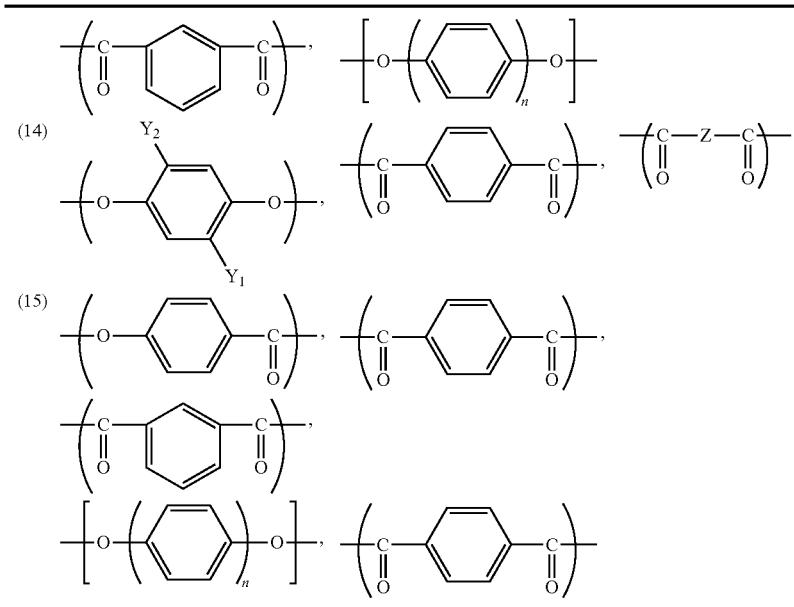
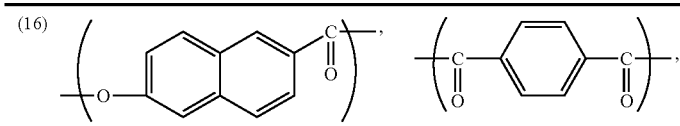
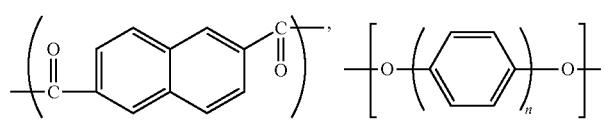
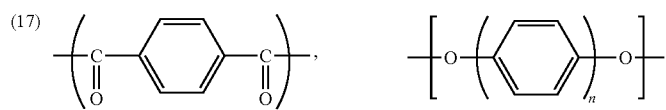
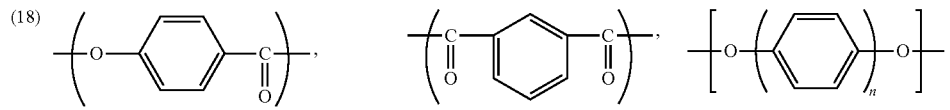

Z in (14) of Table 3 may comprise divalent groups represented by the formulae below:

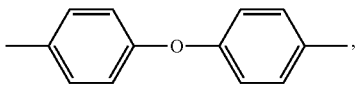

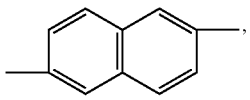

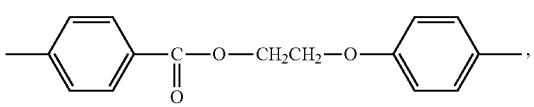

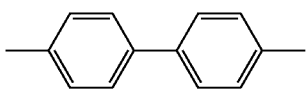

In some embodiments a liquid crystalline polyester may be a combination comprising a naphthalene skeleton as a polymerized unit. Particularly, it may include both a polymerized unit (A) derived from 4-hydroxybenzoic acid and a polymerized unit (B) derived from 6-hydroxynaphthalene-2-carboxylic acid. For example, the unit (A) may be of formula (A) and the unit (B) may be of formula (B). From the viewpoint of improving melt moldability, a ratio of the units (A) to the units (B) may be in a range of from 9/1 to 1/1, preferably 7/1 to 1/1, and more preferably 5/1 to 1/1.

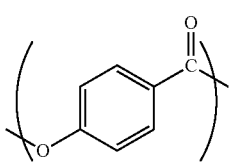

(A)

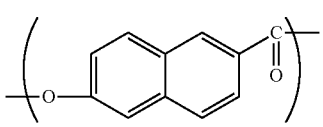

(B)

The total of the polymerized units (A) and the polymerized units (B) may be, for example, about 65 mol % or more, or about 70 mol % or more, or about 80 mol % or more, based on the total polymerized units. In some embodiments the filaments may include a liquid crystalline polyester comprising about 4 to about 45 mol % of the polymerized unit (B) in the polymer.

Commercially available LCP filaments of the present disclosure may include VECTRAN® HT BLACK manufactured by KURARAY CO., LTD., VECTRAN® HT manufactured by KURARAY CO., LTD., SIVERAS® manufactured by Toray Industries, Inc., monofilament manufactured by ZEUS and ZXION® manufactured by KB SEIREN, LTD.

According to the present disclosure, "aramid filament" means a polyamide filament with high heat resistance and high strength comprising a molecular skeleton composed of an aromatic (benzene) ring. Aramid filaments may be classified into a para-aramid filament and a meta-aramid filament according to a chemical structure thereof.

Examples of commercially available aramid and copolymer aramid filaments include para-aramid filaments, for example, KEVLAR® manufactured by DuPont, HERACRON® from Kolon Industries Inc. and TWARON® manufactured by Teijin Ltd.; and meta-aramid filaments, for example, NOMEX® manufactured by DuPont and CONEX® manufactured by Teijin Ltd.

In some embodiments, lyotropic LCP filaments may include one or more copolymer aramid filaments. For example, in some embodiments, the lyotropic LCP filaments comprise a copolyparaphenylene/3,4'-oxydiphenylene terephthalamide filament. This material is conventionally referred to as TECHNORA® and is available from Teijin.

Polyparaphenylenebenzobisoxazole (poly(p-phenylene-2,6-benzobisoxazole) (PBO) filaments are commercially available as ZYLON® AS and ZYLON® HM manufactured by Toyobo Co., Ltd.

Commercially available non-LCP filaments include polyether ether ketone (PEEK) materials such as VICTREX™ PEEK polymers.

Other non-LCP filaments include ultra-high molecular weight polyethylene filaments. These may have an intrinsic viscosity in a range of from about 5.0, or from about 7.0, or from about 10, to about 30, or to about 28, or to about 24 dL/g.

ASTM standards (for example Test Methods D789, D1243, D1601, and D4603, and Practice D3591) that describe dilute solution viscosity procedures for specific polymers, such as nylon, poly(vinyl chloride), polyethylene, and poly(ethylene terephthalate) are available. Generally, the polymer is dissolved in dilute solution and a drop time through a capillary tube versus a control sample is measured at a specific temperature.

A weight average molecular weight of the ultra-high molecular weight polyethylene filament may be from about 700,000, or from about 800,000, or from about 900,000, to about 8,000,000, or to about 7,000,000, or to about 6,000,000.

Due to difficulties in determining the weight average molecular weight of ultra-high molecular weight polyethylene filaments using GPC methods, it is possible to determine the weight average molecular weight based on a value of the above-mentioned intrinsic viscosity according to the equation below mentioned in "Polymer Handbook Fourth Edition, Chapter 4 (John Wiley, published 1999)".

$$\text{Weight average molecular weight} = 5.365 \times 10^4 \times (\text{intrinsic viscosity})^{1.37}$$

In some embodiments it may be preferable for the repeating units of the ultra-high molecular weight polyethylene filament to contain substantially ethylene. However, it may be possible to use, in addition to a homopolymer of ethylene, a copolymer of ethylene with a small amount of another monomer, for example, α-olefin, acrylic acid and derivatives thereof, methacrylic acid and derivatives thereof, and vinylsilane and derivatives thereof. The polyethylene filament may have a partial crosslinked structure. The polyethylene filament may also be a blend of a high-density polyethylene with an ultra-high molecular weight polyethylene, a blend of a low-density polyethylene with an ultra-high molecular weight polyethylene, or a blend of a high-density polyethylene, a low-density polyethylene with an ultra-high molecular weight polyethylene. The polyethylene filament may be a combination of two or more ultra-high molecular weight polyethylenes having different weight average molecular weights, or two or more polyethylenes having different molecular weight distributions.

Commercially available ultra-high molecular weight polyethylene filaments include DYNEEMA® SK60, DYNEEMA® SK, IZANAS® SK60 and IZANAS® SK71 manufactured by Toyobo Co., Ltd., and SPECTRA FIBER 900® and SPECTRA FIBER 1000® manufactured by Honeywell, Ltd.

These ultra-high molecular weight polyethylene filaments can be used alone or in combination.

In some embodiments, the LCP filaments in the looped filamentary elements and/or in the main filamentary elements have a size of at least 1.0 denier per filament (dpf), at least 2.5 dpf, at least 5 dpf, at least 10 dpf, at least 15 dpf, at least 20 dpf, at least 25 dpf, at least 30 dpf, at least 35 dpf, or at least 40 dpf. In some embodiments, the LCP filaments in the have a size of at most 100 dpf, at most 90 dpf, at most 80 dpf, at most 70 dpf, at most 60 dpf, at most 50 dpf, at most 40 dpf, at most 35 dpf, at most 30 dpf, at most 25 dpf, at most 20 dpf, at most 15 dpf, or at most 10 dpf.

Preferably, when the LCP filaments are present in a multifilament fiber, the LCP filaments have a size of at least 1.0 dpf. Alternatively, when the LCP filaments are present in monofilament fibers, the LCP filaments preferably have a size of at least 10 dpf.

In some embodiments, each multifilament fiber comprises at least 5 LCP filaments, at least 10 LCP filaments, at least 15 LCP filaments, at least 25 LCP filaments, at least 50 LCP filaments, at least 100 LCP filaments, at least 200 LCP filaments, at least 500 LCP filaments, at least 1000 LCP filaments, or at least 2000 LCP filaments. In some embodiments, each multifilament fiber comprises at most 5000 LCP filaments, at most 2000 LCP filaments, at most 1000 LCP filaments, at most 500 LCP filaments, at most 200 LCP filaments, at most 100 LCP filaments, at most 50 LCP filaments, or at most 25 LCP filaments.

In some embodiments, the filamentary braid has a cross-sectional diameter of at least 0.02 mm, at least 0.03 mm, at least 0.05 mm, at least 0.07 mm, at least 0.10 mm, at least 0.15 mm, at least 0.20 mm, at least 0.25 mm, at least 0.30 mm, at least 0.40 mm, at least 0.50 mm, at least 0.60 mm, or at least 0.70 mm. In some embodiments, the filamentary braid has a cross-sectional diameter of at most 0.80 mm, at most 0.70 mm, at most 0.60 mm, at most 0.50 mm, at most 0.40 mm, at most 0.35 mm, at most 0.30 mm, at most 0.25 mm, at most 0.20 mm, at most 0.15 mm, at most 0.10 mm, at most 0.07 mm, at most 0.05 mm, or at most 0.03 mm.

In some embodiments, the filamentary braid is a sheath surrounding a core. Such embodiments may be referred to as a cord comprising the filamentary braid surrounding a core. In other embodiments, the filamentary braid does not surround a core.

Methods for Producing Filamentary Braid

Embodiments described herein include methods for producing the filamentary braid disclosed above. The methods generally involve braiding using a plurality of bobbins, at least one of which operates at a lower tension and/or faster feed rate than other of the bobbins to form the looped filamentary elements.

Figure 5:
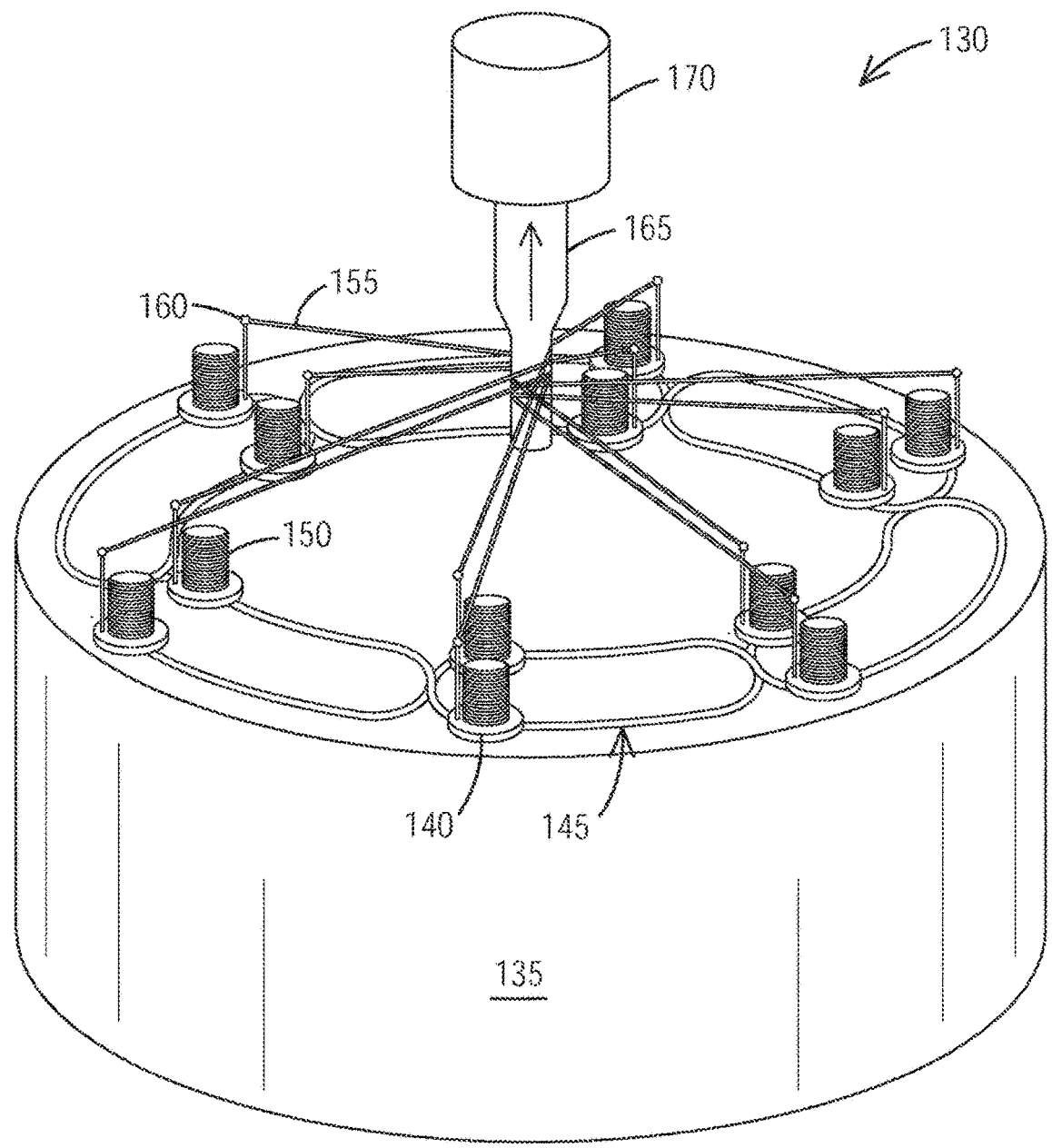
FIG. 5 is a schematic illustration of a 12-carrier braiding apparatus capable of producing the filamentary braid of the present disclosure.

FIG. 5 illustrates one embodiment of a braiding apparatus 130 that can be used to produce filamentary braids of the present disclosure. The braiding apparatus 130 includes a main enclosure 135 that rotates during operation and mounts twelve (12) carriers 140 that independently move along the upper surface of the main enclosure 135 in circular carrier paths 145 that enable the carriers 140 to follow continuous "figure 8" patterns. Each carrier 140 includes a bobbin 150 capable of dispensing a filament bundle 155 via a guide 160 that directs the filament bundle 155 towards a central winding shaft 165 that be controlled with a winding shaft moving mechanism 170 to move in an axial direction. FIG. 5 illustrates a pull-off orientation for each bobbin 150; however, a roll-off orientation for each bobbin 150 also may be used.

Aside from modifications to the braiding apparatus 130 that may be performed to enable it to more effectively form looped filamentary elements, the braiding apparatus 130 functions in a similar manner compared to conventional braiding apparatuses. That is, a filamentary braid may be formed on the central winding shaft 165 in FIG. 5 by crossing the strands diagonally in such a way that each group of strands pass alternately over and under a group of strands laid in the opposite direction. Alternatively, a filamentary braid may be formed without using the central winding shaft 165.

In some embodiments, modifications enabling a braiding apparatus to more effectively form looped filamentary elements may be performed on a commercially-available braiding apparatus. Braiding equipment is commercially available and units of differing capabilities may be obtained. Suitable braiding equipment may include commercially-available braiders from Steeger USA (Inman, South Carolina USA), Herzog GmbH (Oldenburg, Germany), and other manufacturers, that are designed for the braiding of fine-denier filaments and bundles. However, the equipment available for modification is not limited to any specific manufacturers. Upper and lower limits for the number of carriers included in the braiding apparatus are not limited and may be determined according to the desired braid parameters and design.

In some embodiments, methods for producing the filamentary braid involve braiding using a plurality of bobbins, at least one of which operates at a lower tension and/or faster feed rate than other of the bobbins to form the looped filamentary elements. This can be achieved, for example, by removing one or more ratchet springs and/or tension springs in one or more of the carriers 140. In such embodiments, the looped filamentary elements of the filamentary braid are formed from the at least one bobbin operating at a lower tension and/or faster feed rate, and the main filamentary elements of the filamentary braid are formed from the other bobbins.

EMBODIMENTS

Embodiment [1] of the present disclosure relates to a filamentary braid comprising a plurality of filamentary elements braided together, wherein the filamentary elements comprise one or more main filamentary elements and one or more looped filamentary elements,
wherein the looped filamentary elements are arranged in one or more looped structures extending outward from the longitudinal axis formed by the main filamentary elements,
wherein the looped filamentary elements are made of a fiber having a tensile modulus of 2.3 GPa or more, and
wherein, upon application of selective tension to the looped filamentary elements, the looped filamentary elements (i) are collapsible against the main filamentary elements in the filamentary braid and/or (ii) are removable from the filamentary braid.

Embodiment [2] of the present disclosure relates to the filamentary braid of Embodiment [1] wherein the looped filamentary elements are a different color than the main filamentary elements.

Embodiment [3] of the present disclosure relates to the filamentary braid of Embodiment [1] or [2], wherein the looped filamentary elements comprise one or more liquid crystal polymer filaments.

Embodiment [4] of the present disclosure relates to the filamentary braid of Embodiment [3], wherein the looped filamentary elements consist of one or more liquid crystal polymer filaments.

Embodiment [5] of the present disclosure relates to the filamentary braid of at least one of Embodiments [1]-[4], wherein the main filamentary elements comprise one or more liquid crystal polymer filaments.

Embodiment [6] of the present disclosure relates to the filamentary braid of Embodiment [5], wherein the main filamentary elements consist of one or more liquid crystal polymer filaments.

Embodiment [7] of the present disclosure relates to the filamentary braid of at least one of Embodiments [1]-[6], wherein the main filamentary elements and the looped filamentary elements differ in surface friction.

Embodiment [8] of the present disclosure relates to the filamentary braid of Embodiment [7], wherein the main filamentary elements, the looped filamentary elements, or both, comprise a low-friction coating.

Embodiment [9] of the present disclosure relates to the filamentary braid of at least one of Embodiments [1]-[8], wherein the looped filamentary elements are collapsible against the main filamentary elements in the filamentary braid upon application of selective tension to the looped filamentary elements.

Embodiment of the present disclosure relates to the filamentary braid of at least one of Embodiments [1]-[9], wherein the looped filamentary elements are removable from the filamentary braid upon application of selective tension to the looped filamentary elements.

Embodiment of the present disclosure relates to the filamentary braid of at least one of Embodiments [1]-[10], wherein the looped filamentary elements are monofilament fibers.

Embodiment of the present disclosure relates to the filamentary braid of at least one of Embodiments [1]-[11], wherein the main filamentary elements are monofilament fibers Embodiment of the present disclosure relates to a method of producing the filamentary braid of at least one of Embodiments [1]-[12], comprising braiding together filamentary elements fed from a plurality of bobbins, wherein at least one bobbin operates at a lower tension and/or faster feed rate than other of the bobbins, wherein the looped filamentary elements are formed from said at least one bobbin operating at a lower tension and/or faster feed rate, and wherein the main filamentary elements are formed from said other bobbins.

Embodiment of the present disclosure relates to the method of Embodiment [13], wherein said at least one bobbin operates at a lower tension than said other bobbins.

Embodiment of the present disclosure relates to the method of at least one of Embodiments [13]-[14], wherein said at least one bobbin operates at a faster feed rate than said other bobbins.

The above description is presented to enable a person skilled in the art to make and use the invention, and is provided in the context of a particular application and its requirements. Various modifications to the embodiments disclosed herein will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the disclosure may not show every benefit of the invention, considered broadly.

REFERENCE CHARACTERS 5 filamentary braid in FIG. 1
10 main filamentary elements in FIG. 1
15 looped filamentary elements in FIG. 1
20 longitudinal axis formed by the main filamentary elements in FIG. 1
130 braiding apparatus in FIG. 5
135 main enclosure in FIG. 5
140 carrier in FIG. 5
145 carrier path in FIG. 5
150 bobbin in FIG. 5
155 filament bundle in FIG. 5
160 guide in FIG. 5
165 central winding shaft in FIG. 5
170 winding shaft moving mechanism in FIG. 5

What is claimed is:

1. A filamentary braid comprising a plurality of filamentary elements braided together,
    wherein the filamentary elements comprise one or more main filamentary elements and one or more looped filamentary elements,
    wherein the looped filamentary elements are arranged in one or more looped structures extending outward from the longitudinal axis formed by the main filamentary elements,
    wherein the looped filamentary elements are made of a fiber having a tensile modulus of 2.3 GPa or more, and
    wherein, upon application of selective tension to the looped filamentary elements, the looped filamentary elements (i) are collapsible against the main filamentary elements in the filamentary braid and/or (ii) are removable from the filamentary braid.

2. The filamentary braid of claim 1, wherein the looped filamentary elements are a different color than the main filamentary elements.

3. The filamentary braid of claim 1, wherein the looped filamentary elements comprise one or more liquid crystal polymer filaments.

4. The filamentary braid of claim 3, wherein the looped filamentary elements consist of one or more liquid crystal polymer filaments.

5. The filamentary braid of claim 1, wherein the main filamentary elements comprise one or more liquid crystal polymer filaments.

6. The filamentary braid of claim 5, wherein the main filamentary elements consist of one or more liquid crystal polymer filaments.

7. The filamentary braid of claim 1, wherein the main filamentary elements and the looped filamentary elements differ in surface friction.

8. The filamentary braid of claim 7, wherein the main filamentary elements, the looped filamentary elements, or both, comprise a low-friction coating.

9. The filamentary braid of claim 1, wherein the looped filamentary elements are collapsible against the main filamentary elements in the filamentary braid upon application of selective tension to the looped filamentary elements.

10. The filamentary braid of claim 1, wherein the looped filamentary elements are removable from the filamentary braid upon application of selective tension to the looped filamentary elements.

11. The filamentary braid of claim 1, wherein the looped filamentary elements are monofilament fibers.

12. The filamentary braid of claim 1, wherein the main filamentary elements are monofilament fibers.

13. A method of producing the filamentary braid of claim 1, comprising braiding together filamentary elements fed from a plurality of bobbins, wherein at least one bobbin operates at a lower tension and/or faster feed rate than other of the bobbins, wherein the looped filamentary elements are formed from said at least one bobbin operating at a lower tension and/or faster feed rate, and wherein the main filamentary elements are formed from said other bobbins.

14. The method of claim 13, wherein said at least one bobbin operates at a lower tension than said other bobbins.

15. The method of claim 13, wherein said at least one bobbin operates at a faster feed rate than said other bobbins.

\* \* \* \* \*